Figures 1, 2:
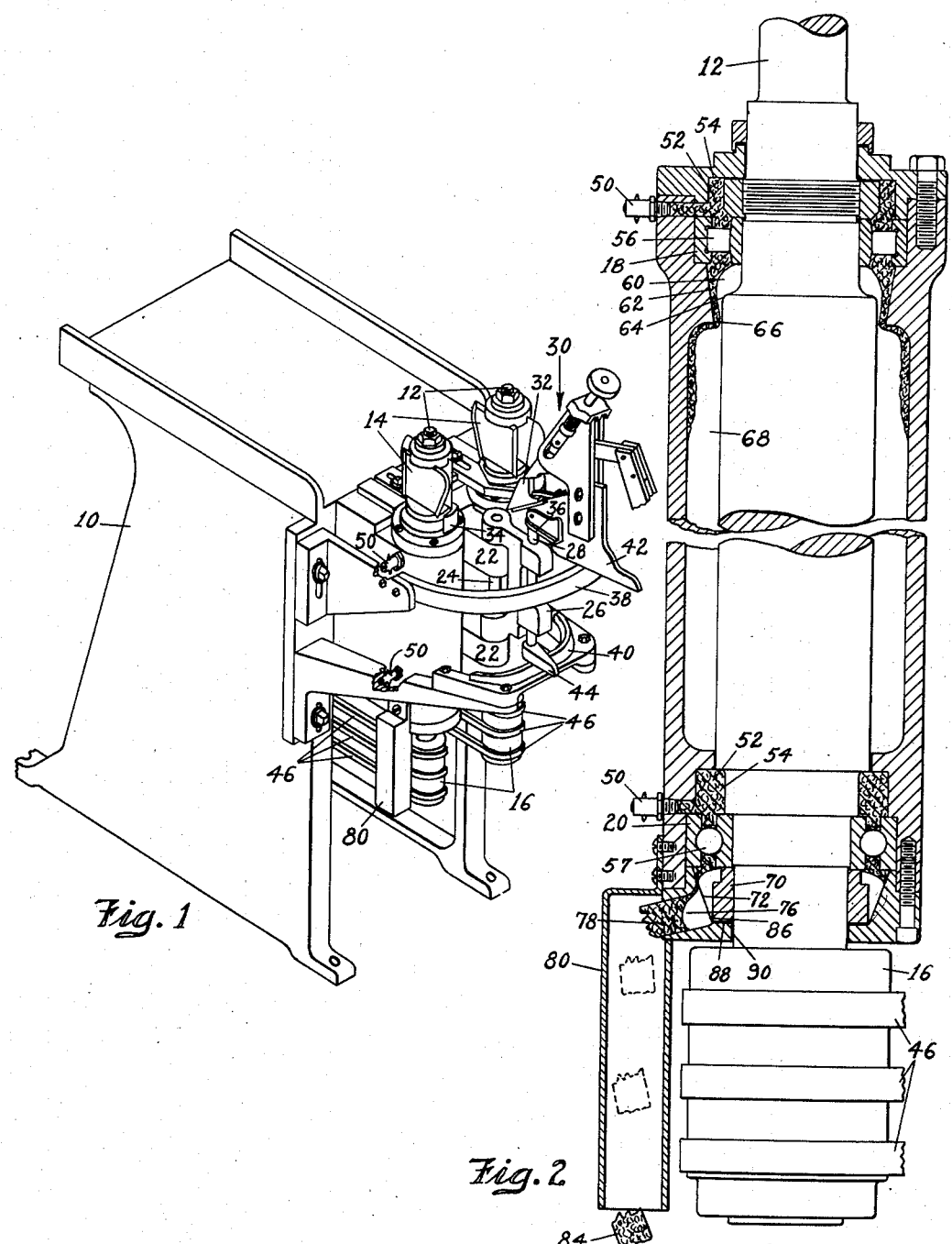

Nov. 12, 1940.　　　L. B. POPE ET AL　　　2,221,457
METHOD OF AND MEANS FOR LUBRICATING HIGH-SPEED SPINDLES
Filed April 19, 1938

Inventors
Lyman B. Pope
George T. Watt
By Wright, Brown,
Quinby & May
Attorneys

Patented Nov. 12, 1940

2,221,457

UNITED STATES PATENT OFFICE 2,221,457

METHOD OF AND MEANS FOR LUBRICATING HIGH-SPEED SPINDLES

Lyman B. Pope and George T. Watt, Haverhill, Mass., assignors to Pope Machinery Corporation, Haverhill, Mass., a corporation of Massachusetts Application April 19, 1938, Serial No. 202,916

6 Claims. (Cl. 308—187)

This invention relates to the lubrication of ball and roller type bearings in high-speed spindles having axes at an angle to the horizontal, and to a method of lubricating the same.

For purposes of illustration, we shall herein describe and illustrate the invention as embodied in a machine for shaping the side and rear portions of wood heels. This machine is of the type shown in United States Letters Patent No. 2,039,695, granted to George T. Watt on May 5, 1936. This patent shows a lubricating system which has proven to be entirely satisfactory as far as efficiency is concerned, but it is the object of the present invention to provide a greatly simplified mechanism which will yield equally satisfactory results at a much lower cost of construction.

Vertical spindles for wood working machines such as the heel-shaping machine herein illustrated are generally driven at high speed for best results and because of the fact that such spindles must run true and be free from objectionable deflections caused by cutting stresses or out-of-balance conditions, the spindles and bearings must be of substantial size. This large size creates difficulties in the selection of bearings that will stand such high speed and particularly in the design of a lubricating system which will keep such bearings cool.

Bearings of the well known, fully shielded type, carrying a life supply of grease, are satisfactory on vertical spindles rotating at moderate speeds as in electric motors which usually run at less than 4000 R. P. M. Bearings having shields below the balls and provisions for adding grease periodically above the balls are also satisfactorily used at such moderate speeds. These bearings ordinarily use a soft grease which will, at least under operating temperatures, flow into, or attempt to flow into, the path of the balls or rollers. This action is necessary in the case of the permanently sealed bearings and desirable in the under sealed type above mentioned in order that lubrication of the balls be maintained over long periods, and, while this action causes some temperature rise from the increased friction within the lubricant and this rise in turn causes an increased grease flow into or toward the path of the balls, which tends to raise the temperature further and so on, these theoretically accumulating effects do not become really troublesome at these moderate speeds.

We have found, however, that at the high speeds ranging upwards from 7000 R. P. M. necessary for the efficient cutting of wood as in the machine herein illustrated, the above described pyramiding effects cause a temperature rise so severe as to become destructive to both the grease and the bearings.

It is an object of this invention to provide a highly efficient lubricating system at an extremely low construction cost. To this end we have devised a bearing arrangement and a grease lubricating system therefor which have proven in practice superior to existing types of this class of machines, both with respect to smooth and rigid spindle operation and to cool operation of the bearings. The details of the invention will hereinafter be more fully described, but essentially the novelty resides in the use of certain combination of roller and ball bearings and in the provision for supplying to these bearings only the amount of grease needed for lubrication and for preventing the accumulation of excess grease which would cause over-heating.

To accomplish this result, we provide an annular fully-enclosed space above each bearing, which is completely filled at assembly with one of the harder boiled greases having no flow characteristics at ordinary operating temperatures. A grease fitting allows periodical additions, such as weekly for example, of a small quantity of this grease. Most of this added grease is forced into and through the bearing, thus replacing any lubricant which has by rubbing contact been taken from the spaces around the balls or rollers. Grease that is in the path of the balls or rollers is, during the first few revolutions of the spindle and bearing, forced upward into any vacant space there may be above the bearing, and downward into free space. The balls or rollers are then properly lubricated for days or even weeks of service. Small amounts of lubricant are fed into the bearing by actual contact of wetted surfaces against adjacent grease walls. This action gradually slows down with use, and would, if no additional lubricant were supplied, finally cease. It is not intended that the bearing shall ever receive any substantial amount of grease from the space above the bearing. The grease therein simply acts to exclude any dust which might seek entrance from above, and more particularly to cause the periodical grease additions to be applied immediately and almost wholly to the working parts of the bearing. By this method the bearing never has an excess of grease to handle except momentarily at the time of grease additions. After this brief period, which is much too short to cause objectionable heating, the bearing is properly lubricated for coolest operation and hence for maximum useful life.

There remains the problem of the disposal of the used grease, which in its passage through the bearing has become milled and softened in character. The grease discharged from the upper bearing, in the machine illustrated, may be allowed to travel down into the housing space which is amply large enough to receive all of the used grease from the bearing which may accumulate during the lifetime of the bearing. At the time of bearing renewal, this accumulated grease would, of course, be removed from the housing.

In providing for the discharge of used grease from the lower bearing, it is very important to prevent any of the grease from reaching the driving belts below the bearing, since grease is objectionable on belts of any kind and especially on belts containing rubber. Commercial oil and grease seals, of which a large variety is available, are impractical because of the high spindle speed of the machine illustrated. The large diameter spindles therein employed have in such high surface speeds at the areas on which mechanical grease seals must operate that leather, fiber, rubber or even metal-to-metal seals are quickly destroyed or at least rendered inoperative by the high temperatures developed, especially when a rather hard grease lubricant is used. To avoid this difficulty, we have devised a mechanism which controls the grease movement by means of air pressure and in which no rubbing contacts occur.

An object of the present invention is to provide means for preventing the used grease from working down the spindle and for discharging it harmlessly, clear of all apparatus which might be damaged thereby. We accomplish this by the use of a novel structure hereinafter described in detail.

These and other features of the invention will be best understood from the following description and drawing of a preferred embodiment thereof in which Figure 1 is an isometric view of a machine in which the invention is employed.

Figure 2 is an enlarged cross section of one of the spindles of the machine shown in Figure 1.

The wood-shaping machine illustrated in the drawing comprises a frame having two cutter spindles 12 with form cutters 14 and belt pulleys 16 mounted respectively at the upper and lower ends thereof, the spindles being carried on upper and lower anti-friction type bearings 18 and 20. Also carried by the frame between the spindles are bosses 22 supporting a vertical crane shaft 24. This shaft carries a crane 26 in which is mounted a vertical jack shaft 28 on which is pivotally mounted a work-holding jack 30. The construction and operation of the jack are well known and need not therefore be specifically described herein, it being sufficient to say that the jack is adapted to support a heel blank 32 which is engaged on either of the cutters by swinging the jack about the axis of the crane shaft 24. This movement of the jack toward the cutters is limited by adjustable collars or stops 34 engaged by a cam plate 36 carried by the jack.

The movements of the jack in the cutting operation are controlled by the cam plate 36 and by upper and lower tracks 38 and 40 supported on and extending about the frame. Briefly the upper track controls the tilting of the heel blanks through the agency of a rider 42 on the track 38 and the lower track controls the elevation of the heel blank through the agency of a rider 44 and other connections including the jack shaft 28, the rider 44 engaging the lower track 40, all of which is well understood in machines of this type. Multiple type belts 46 run in grooves in pulleys 16 from suitable power means (not shown) within the frame 10.

As has been heretofore stated, the cutter spindles 12 are rotated at relatively high speeds (e. g. 8000 R. P. M.) and one novel feature of our invention is the provision of improved means assuring adequate and proper lubrication of spindle bearings 18 and 20 at all times. This lubricating function requires the use of an ordinary hand-operated grease gun (not shown) which is to be applied to grease fittings 50 periodically for the introduction of small quantities of grease 52 into chambers 54 above the bearings 18 and 20. The bearings 18 and 20 may be of any suitable construction including a series of rolling elements running in a raceway. As shown, the rolling elements in the upper bearing 18 are cylinders 56, and in the lower bearing 20 they are balls 57. Other forms of rolling elements may be employed as may be found useful or desirable.

When the spindle is first set up for operation, sufficient grease is inserted in each bearing to fill the chamber 54 and the spaces in the adjacent bearing race. Excess grease in the upper bearing works down past the rollers 56 into a chamber 60 just below the race. The outer wall 62 of this chamber slants downward and inward, having a truncated conical shape converging toward the surface of the spindle below a shoulder 64 on the spindle. The tangential air blast from the spindle, resulting from skin friction at high speeds of operation, tends to flatten excess grease entering the chamber against the wall 62. This blast is stronger in the lower portion of the chamber than in the upper portion due to the larger diameter, and hence peripheral speed, of the spindle below the shoulder 64 than above. As more grease is added to the bearing and works down into the chamber 60 in driblets, the air blast against the slanting wall 62 blows some of the driblets up against the rollers, but, since the angle of slant is slight, some of the grease works down past the lower edge 66 of the wall into a relatively large chamber 68 between the casing and the spindle. When a substantially stable condition is reached after the addition of some grease to the upper bearing, the grease in the chamber 60 is disposed substantially as indicated in Figure 2 under the influence of the air blast from the adjacent surface of the rotating spindle. The chamber 68 serves as storage space and is of sufficient capacity to receive all of the excess grease which accumulates from the upper bearing during the lifetime of the bearing.

In the lower bearing the grease movements through the bearing 20 are similar to those just described for the upper bearing, but below the bearing the construction and resulting action differs. Since for purposes of assembling the spindle the diameter below the lower bearing is less than above this bearing, a collar 70 is preferably mounted on the spindle just below the lower bearing so as to increase the effective diameter of the spindle at this point, and hence to increase the air swirl therefrom in the chamber below the lower bearing. The outer wall 72 of this chamber has a truncated conical shape and is more sharply slanted than the wall 62 of the corresponding chamber at the upper bearing so as to prevent any grease whatever from working down the shaft of the spindle below the chamber. A grease discharge aperture 76 is cut through the wall 72 and a grease discharge tube 80 is mounted at the orifice of the aperture 76 to conduct the grease blobs 84 which break off from time to time from the grease accumulation 78 in the aperture 76. The tube 80 insures that no waste grease can possibly reach the belts 46.

The operation of the foregoing combination of elements is as follows. The air swirl from the collar 70 has a strong outward component and probably a stronger circumferential component, this latter motion being in the direction of spindle rotation. Grease of the kind described issues from the bearing in the form of small strings or driblets, and these driblets under the influence of the swirling air blast are caused to perform a sort of hop, skip and jump dance around the inclined wall. Some of them are lifted upward into light contact with the lower surface of the bearing. This helps to keep the parts properly wetted but the impact is not vigorous enough to force any quantity of lubricant into the path of the balls. The discharge opening is positioned in the inclined wall so that most of the grease driblets are blown out through, or into, said opening before they make a complete revolution around the spindle. Grease of the general kind described will not flow at all under the influence of gravity alone so that no travel of grease down the spindle and through the housing and closure occurs when the spindle is at rest.

Observations of actual production machines of the class illustrated have shown that the force of the air blast thrown by the collar 70 against the truncated conical inner wall 72 is sufficient to prevent any grease from reaching the lower portions 86 of the space between the wall and the spindle. This is because the air pressure on the wall increases as the space between the collar and the wall decreases, that is, the intensity of the outward air blast increases downwardly to a maximum at a point opposite the lower portion of the discharge opening 76. This discharge opening is so effective that observation of machines in regular factory use has shown that the disposition of waste grease is about as illustrated in Figure 2, that is, exclusively through the aperture 76, none of the grease being permitted to work down through the spaces 88 and 90. The heel-shaping machine illustrated and described herein is greatly improved by the application of this invention thereto. The invention is not limited to this machine, however, but is applicable to many high-speed spindle applications.

If desired, waste grease from the upper bearing may be discharged in the same manner as that from the lower bearing by the provision of a suitable aperture in the wall 62, but in the particular structure illustrated the storage space 68 is ample to accommodate all of the used grease which will accumulate up to the time when the bearing must be renewed, at which time the accumulation can be cleaned out.

Having thus described our invention, what we claim as new and desire to secure by Letters Patent is:

1. Bearing structure for a high-speed vertical spindle, comprising a housing around said spindle, a bearing race within said housing, and a series of anti-friction rolling elements in said race, said housing having a portion of its inner wall above said bearing race spaced from the spindle to form an annular enclosure for grease, said housing having a sloping wall portion immediately below said race converging downwardly toward said spindle and an outlet through said sloping wall for the discharge of used grease.

2. Bearing structure for a high-speed vertical spindle, comprising a housing around said spindle, a bearing race within said housing, a series of rolling elements in said race, an annular chamber below said race between a portion of said spindle and a portion of the housing wall which portion slopes downwardly and inwardly toward the spindle, and means for admitting fresh grease to the bearing above said rolling elements.

3. In a machine of the class described, an approximately vertical spindle, a housing carrying an anti-friction type bearing for said spindle, a grease chamber above said bearing, a collar fast on said spindle below the bearing, and a housing adjacent to said collar, said housing having an internal surface portion surrounding the collar which is of truncated conical shape with its larger end up and having a grease discharge opening therethrough.

4. In combination with a power-driven rotatable spindle, a housing carrying a bearing for said spindle, a collar fast on the spindle, a member fast on the housing having an internal truncated conical wall surrounding said collar, and an opening in said wall.

5. A method of causing grease which descends from a high speed spindle bearing in a housing to be discharged exclusively through an aperture in the housing below the bearing, said method comprising directing against the descending grease an outward blast of air which increases downwardly in intensity to a point of maximum intensity opposite the lower portion of said aperture.

6. Bearing structure for a high-speed vertical spindle, comprising a housing around said spindle, a bearing race within said housing, and a series of rolling anti-friction elements in said race, said housing being formed to provide an annular space for grease immediately above said bearing elements, said housing also having an annular chamber below said bearing elements, said last-named chamber having a conically sloping outer wall surrounding a portion of said spindle and converging downwardly toward the surface of the spindle, and means for the free escape of grease outward from said chamber.

LYMAN B. POPE.
GEORGE T. WATT.